US012263732B2

(12) United States Patent
Mino et al.

(10) Patent No.: US 12,263,732 B2
(45) Date of Patent: Apr. 1, 2025

(54) IMAGING AND DISPLAY SYSTEM

(71) Applicant: Panasonic Intellectual Property Management Co., Ltd., Osaka (JP)

(72) Inventors: Yoshiteru Mino, Osaka (JP); Hideki Takahashi, Osaka (JP); Masaki Tada, Osaka (JP); Toshiya Mori, Osaka (JP); Hiroaki Okayama, Nara (JP); Kazuhiro Minami, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 238 days.

(21) Appl. No.: 17/950,606

(22) Filed: Sep. 22, 2022

(65) Prior Publication Data
US 2023/0019596 A1    Jan. 19, 2023

Related U.S. Application Data

(63) Continuation of application No. PCT/JP2021/001360, filed on Jan. 15, 2021.

(30) Foreign Application Priority Data

Mar. 31, 2020    (JP) .................................. 2020-063144

(51) Int. Cl.
*B60K 35/00*    (2024.01)
*B60R 1/29*    (2022.01)
(Continued)

(52) U.S. Cl.
CPC ............... *B60K 35/00* (2013.01); *B60R 1/29* (2022.01); *B60K 35/23* (2024.01); *B60K 35/60* (2024.01);
(Continued)

(58) Field of Classification Search
CPC ................................ B60K 35/00; H04N 7/183
See application file for complete search history.

(56) References Cited

U.S. PATENT DOCUMENTS

| 2001/0019662 A1* | 9/2001 | Shono .................... G03B 17/18 |
| | | 348/E5.025 |
| 2009/0059033 A1* | 3/2009 | Shimada ................ H04N 23/73 |
| | | 348/229.1 |

(Continued)

FOREIGN PATENT DOCUMENTS

| JP | H03-42337 A | 2/1991 |
| JP | H05-2118 U | 1/1993 |

(Continued)

OTHER PUBLICATIONS

Office Action issued in Japanese Patent Application No. 2020-063144, dated Dec. 26, 2023, along with an English translation thereof.

(Continued)

*Primary Examiner* — Joan T Goodbody
*Assistant Examiner* — Godfrey Aleksander Maciorowski
(74) *Attorney, Agent, or Firm* — GREENBLUM & BERNSTEIN, P.L.C.

(57) ABSTRACT

Imaging and display system includes: a display; an optical system including a first mirror and a second mirror; a housing; a light-transmissive cover transparent to light and disposed to cover at least part of an opening of the housing; and a driver monitoring camera supported by a supporting body connected outside of the housing. First light emitted from the display passes through the light-transmissive cover via the optical system, and is reflected by a windshield toward a direction of the user. The driver monitoring camera captures an image of a driver shown on the light-transmissive cover by second light from a direction of the driver (Continued)

reflected by the windshield toward a direction of the light-transmissive cover.

8 Claims, 13 Drawing Sheets

(51) Int. Cl.
*B60K 35/23* (2024.01)
*B60K 35/60* (2024.01)

(52) U.S. Cl.
CPC ...... *B60K 2360/21* (2024.01); *B60K 2360/31* (2024.01); *B60K 2360/33* (2024.01); *B60K 2360/785* (2024.01); *B60R 2300/101* (2013.01); *B60R 2300/103* (2013.01); *B60R 2300/105* (2013.01); *B60R 2300/205* (2013.01); *B60R 2300/8006* (2013.01)

(56) References Cited

U.S. PATENT DOCUMENTS

| 2014/0009739 | A1* | 1/2014 | Greco | A61B 3/113 351/206 |
|---|---|---|---|---|
| 2015/0124068 | A1 | 5/2015 | Madau et al. | |
| 2016/0150218 | A1* | 5/2016 | Yoon | G02B 27/0101 348/77 |
| 2018/0037116 | A1 | 2/2018 | Avery | |
| 2018/0252950 | A1* | 9/2018 | Hakemi | H01L 31/02327 |
| 2020/0029026 | A1* | 1/2020 | Li | H04N 23/71 |
| 2021/0271076 | A1* | 9/2021 | Ono | B60K 35/22 |
| 2021/0291750 | A1 | 9/2021 | Shigematsu | |

FOREIGN PATENT DOCUMENTS

| JP | 2006-096316 A | 4/2006 |
|---|---|---|
| JP | 2010-006362 A | 1/2010 |
| JP | 2018-103883 A | 7/2018 |
| JP | 6437045 B2 | 12/2018 |
| JP | 6621106 B2 | 12/2019 |
| WO | WO2020/021823 A1 | 1/2020 |
| WO | WO2020/031660 A1 | 2/2020 |

OTHER PUBLICATIONS

International Search Report issued in International Bureau of WIPO Patent Application No. PCT/JP2021/001360, dated Mar. 16, 2021, along with an English translation thereof.

* cited by examiner

IMAGING AND DISPLAY SYSTEM

CROSS REFERENCE TO RELATED APPLICATIONS

This is a continuation application of PCT International Application No. PCT/JP2021/001360 filed on Jan. 15, 2021, designating the United States of America, which is based on and claims priority of Japanese Patent Application No. 2020-063144 filed on Mar. 31, 2020.

FIELD

The present disclosure relates to an imaging and display system included, for example, in a vehicle.

BACKGROUND

Conventionally proposed imaging and display systems mounted in vehicles include a system having a head up display and a driver monitoring camera (see, for example, Patent Literature (PTL) 1). In this system, the head up display makes a virtual image that appears through a windshield visible to the driver of the vehicle, and the driver monitoring camera further captures an image of such driver.

CITATION LIST

Patent Literature

PTL 1: U.S. Patent Application No. 2018/0037116

SUMMARY

However, the system of PTL 1 can be improved upon.

In view of this, the present disclosure provides an imaging and display system capable of improving upon the above related art.

The imaging and display system according to an aspect of the present invention includes: a display that emits first light representing an image; an optical system that includes at least one mirror; a housing that has an opening and accommodates the display and the optical system; a light-transmissive cover that has transparency to light and is disposed to cover at least part of the opening of the housing; and a camera that is supported by a supporting body, the supporting body being connected outside of the housing to cover at least part of the light-transmissive cover. Here, the first light emitted from the display passes through the light-transmissive cover via the optical system, and is reflected by a display medium toward a direction of a user. The camera is disposed on a surface of the supporting body, and captures an image of the user shown on the light-transmissive cover by second light from the direction of the user reflected by the display medium toward a direction of the light-transmissive cover, the surface of the supporting body being a surface facing the light-transmissive cover.

Note that such general and specific aspect may be implemented using a system, a method, an integrated circuit, a computer program, or a computer-readable recording medium such as a CD-ROM, or any combination of systems, methods, integrated circuits, computer programs, or recording media. Also note that the recording medium may be a non-transitory recording medium.

The imaging and display system according to one aspect of the present disclosure is capable of improving upon the above related art.

Additional advantage and effect in an aspect of the present disclosure are apparent from the specification and the accompanied drawings. Such advantage and/or effect are provided by the characteristics described in an embodiment, and the specification and the drawings, but not all of such advantage and/or effect need to be provided to obtain the same one or more characteristics.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT (Underlying Knowledge Forming Basis of the Present Invention)

The present inventors have found that PTL 1 described in "Background Art" has problems as described below.

Figure 1A:
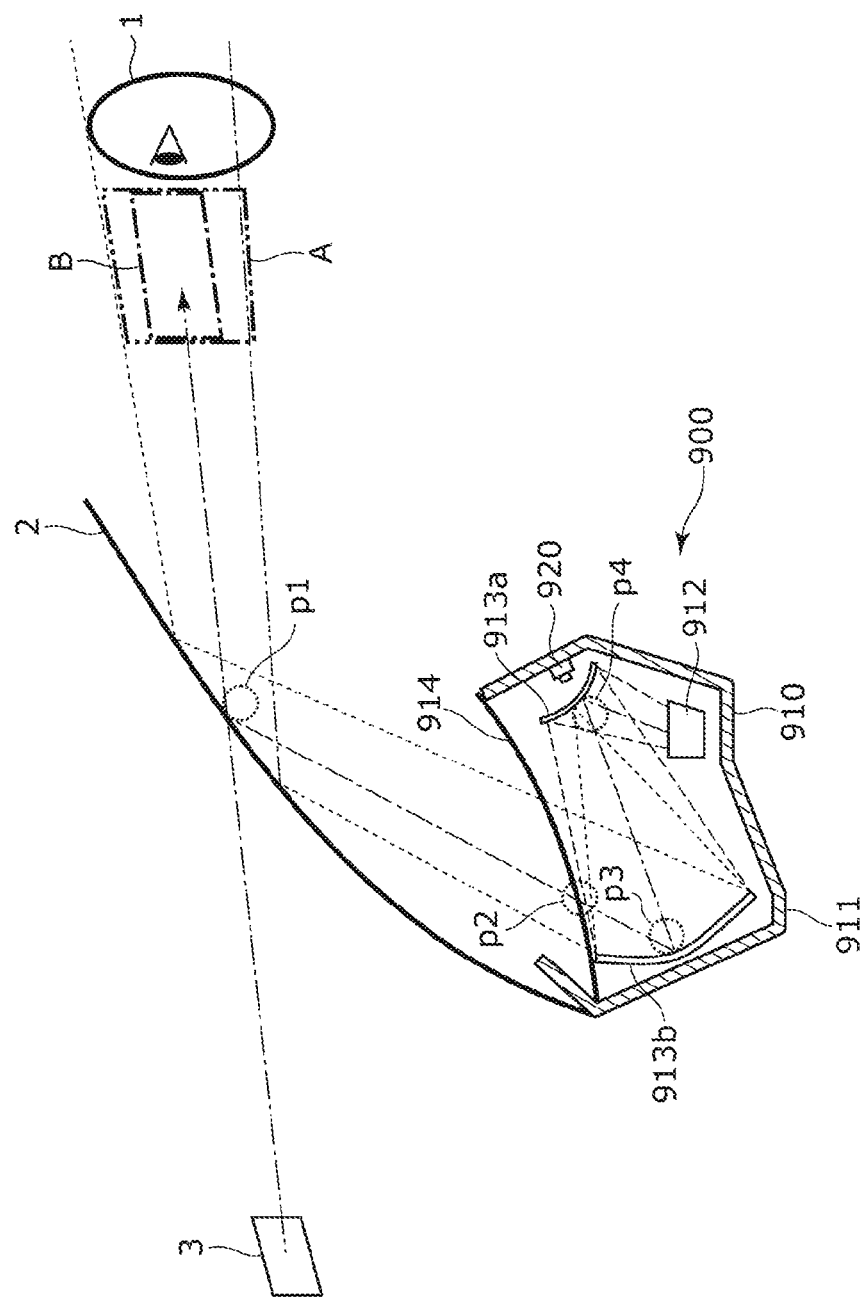
FIG. 1A is a diagram showing the configuration of a system assumed from the conventional technology.

FIG. 1A is a diagram showing the configuration of a system assumed from PTL 1.

Such system 900 includes head up display (hereinafter referred to as HUD) 910 and driver monitoring camera 920.

HUD 910, which is a device mounted in a vehicle, includes housing 911, display 912, first mirror 913a, second mirror 913b, and light-transmissive cover 914.

Light emitted from display 912 representing an image is reflected by first mirror 913a and second mirror 913b, passes through light-transmissive cover 914, and further reflected by windshield 2 of the vehicle toward a direction of driver 1. This enables the image from display 912 to be visible to driver 1, within eye box B, as virtual image 3 that appears through windshield 2.

Driver monitoring camera 920 is disposed inside of housing 911. Light from a direction of driver 1 is reflected by windshield 2 toward a direction of HUD 910, passes through light-transmissive cover 914, and further reflected by second mirror 913b toward a direction of first mirror 913a. Such light then passes through, for example, semi-transparent first mirror 913a to enter the lens of driver monitoring camera 920. This enables driver monitoring camera 920 to capture an image of driver 1.

However, such light from a direction of driver 1 is attenuated after repeatedly reflected at or passing through positions p1 through p4 (positions indicated by broken line circles in FIG. 1A). This decreases the luminance of a monitoring image captured by driver monitoring camera 920. Further, imagining area A across which driver monitoring camera 920 can perform imaging is small.

Figure 1B:
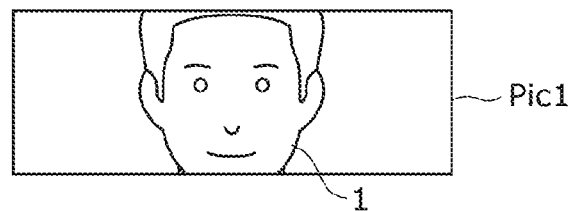
FIG. 1B is a diagram showing an example monitoring image captured by the driver monitoring camera in the system assumed from the conventional technology.

FIG. 1B is a diagram showing an example monitoring image captured by driver monitoring camera 920.

Due to small imaging area A as described above, monitoring image Pic1 captured by driver monitoring camera 920 cannot show a wide area of driver 1. This results in a problem that it is difficult to appropriately monitor driver 1 on the basis of such monitoring image Pic1. Stated differently, there is a problem that it is difficult to appropriately capture an image of the driver who is the user of system 900.

To solve the above problems, the imaging and display system according to an aspect of the present invention includes: a display that emits first light representing an image; an optical system that includes at least one mirror; a housing that has an opening and accommodates the display and the optical system; a light-transmissive cover that has transparency to light and is disposed to cover at least part of the opening of the housing; and a camera that is supported by a supporting body, the supporting body being connected outside of the housing to cover at least part of the light-transmissive cover. Here, the first light emitted from the display passes through the light-transmissive cover via the optical system, and is reflected by a display medium toward a direction of a user. The camera is disposed on a surface of the supporting body, and captures an image of the user shown on the light-transmissive cover by second light from the direction of the user reflected by the display medium toward a direction of the light-transmissive cover, the surface of the supporting body being a surface facing the light-transmissive cover. The display medium is, for example, a windshield of a vehicle.

With this, the display, the optical system, the housing, and the light-transmissive cover form a head up display that makes a virtual image which appears through the display medium visible to the user, and the camera captures an image of the user shown on the light-transmissive cover from outside of the housing of such head up display. The second light from a direction of the user thus reaches the camera without traveling via the optical system of the head up display, thereby enabling the camera to capture an image of the user, using the second light with high intensity. This increases the luminance of the image captured (so-called monitoring image) obtained by such imaging. Also, the camera is located outside of the housing, thereby reducing the effect of collected heat on the camera even when sunlight causes collected heat inside of the housing. Further, it is possible to increase the flexibility in the disposition and design of the camera.

Also, the camera can be placed close to the light-transmissive cover, thereby widening the imaging area of such camera. It is thus possible to appropriately capture a bright image of a wide area of the user, using the configuration of making a virtual image visible to the user. Also, the camera is disposed on a surface of the supporting body, which covers at least part of the light-transmissive cover, that is a surface facing the light-transmissive cover. As such, it is possible for the supporting body to make the camera invisible to the user. This enables the user to concentrate on an operation such as the driving of the vehicle, for example, without being aware of that s/he is subjected to imaging performed by the camera.

For example, a first infrared reflection layer may be stacked on the light-transmissive cover, the first infrared reflection layer having a higher reflectivity for an infrared ray than for visible light and transparent to visible light, and the camera may be an infrared camera. The infrared ray is, for example, light in the near-infrared region.

With this, it is possible to capture an image of the user with reduced effect of, for example, outside light that is visible light, without decreasing the visibility of the user to a virtual image. Also, a second infrared reflection layer may be stacked on the display medium, the second infrared reflection layer having a higher reflectivity for an infrared ray than for visible light and transparent to visible light. For example, the second infrared reflection layer may include two reflection layers, where one of the two reflection layers may be provided on a surface of the display medium, the surface being a surface facing the user, and a remaining one of the two reflection layers may be provided on a surface of the display medium, the surface being a surface opposite the surface facing the user.

With this, it is possible to capture an image of the user more appropriately with further reduced effect of, for example, outside light that is visible light, without decreasing the visibility of the user to a virtual image.

The imaging and display system may further include: an infrared-transmissive portion that is transparent to an infrared ray and has a higher reflectivity or absorptivity for light other than an infrared ray than for an infrared ray. Here, the camera may be an infrared camera and capture an image of the user, using an infrared ray that enters an imaging element inside the camera from the direction of the light-transmissive cover via the infrared-transmissive portion.

With this, it is possible to capture an image of the user further more appropriately with further reduced effect of, for example, outside light that is visible light. For example, it is possible to reduce the effect of sunlight.

Also, a low-reflection layer may be provided on at least part of the camera, the low-reflection layer having a lower reflectivity for visible light than a reflectivity of the supporting body for visible light.

With this, even when outside light such as sunlight is radiated to the camera, for example, it is possible to reduce the reflection, at the camera, of visible light included in such outside light.

Consequently, it is possible to make it hard for an image of the camera to show up on the light-transmissive cover. In other words, it is possible to make it hard for the user to notice the presence of the camera, thus increasing the viewability to an external environment.

Also, the imaging and display system may further include: a light source that is supported by the supporting body and emits an infrared ray as third light. Here, the camera may be an infrared camera, and the third light emitted from the light source may be reflected by the light-transmissive cover toward a direction of the display medium and reflected by the display medium toward the direction of the user. The infrared ray is, for example, light in the near-infrared region.

With this, the third light that is an infrared ray is radiated to the user, thereby enabling imaging of such user lit up by the third light by the infrared camera. Consequently, it is possible to capture an image having high luminance. Also, as in the case of the camera, it is possible for the supporting body to make the light source invisible to the user. Further, a radiation area of the third light is easy to be adjusted to the imaging area of the camera. This enables the light source not to radiate the third light to a wider area than is necessary, thus reducing the radiation power of such third light.

Also, the imaging and display system may further include: a driving unit that shifts an optical axis of the camera; and a controller that controls the driving unit, based on an image captured by the camera. Here, the controller may cause the driving unit to shift the optical axis of the camera when a second region in the image captured is a predetermined distance or less from a first region in which part of the user is shown, the second region having higher luminance than luminance of the first region.

With this, the optical axis of the camera is shifted when the second region that is brightly lit up by, for example, outside light such as sunlight is located close to the first region. Consequently, it is possible to increase the possibility of the second region being spaced apart from the first region. This results in an increased possibility of preventing part of the user shown in the first region from becoming unsharp due to the second region overlapping the first region. When the foregoing part of the user is the eyes, for example, it is hard to identify the state of the user, such as whether the user is sleepy, looking away, and so forth, from an image captured that includes such unsharp first region. However, the imaging and display system according to an aspect of the present disclosure is capable of preventing the first region from becoming unsharp due to the second region overlapping the first region, thus achieving an appropriate monitoring of the state of the user.

Also, the imaging and display system may further include: a second camera different from a first camera that is the camera; a switcher that switches a camera used for imaging the user between the first camera and the second camera; and a controller that controls the switcher, based on an image captured by the first camera. Here, the controller may cause the switcher to switch the camera from the first camera to the second camera when a second region in the image captured is a predetermined distance or less from a first region in which part of the user is shown, the second region having higher luminance than luminance of the first region.

With this, the camera is switched from the first camera to the second camera when the second region that is brightly lit up by, for example, outside light such as sunlight is located close to the first region. This results in an increased possibility of preventing part of the user shown in the first region from becoming unsharp due to the second region overlapping the first region. When the foregoing part of the user is the eyes, for example, it is hard to identify the state of the user, such as whether the user is sleepy, looking away, and so forth, from an image captured that includes such unsharp first region. However, the imaging and display system according to an aspect of the present disclosure is capable of preventing the first region from becoming unsharp due to the second region overlapping the first region, thus achieving an appropriate monitoring of the state of the user.

Note that these general and specific aspects may be implemented using a system, a method, an integrated circuit, a computer program, or a computer-readable recording medium such as a CD-ROM, or any combination of systems, methods, integrated circuits, computer programs, or recording media. Also note that the recording medium may be a non-transitory recording medium.

The following specifically describes the embodiment with reference to the drawings.

The exemplary embodiment described below shows a general or specific example. The numerical values, shapes, materials, elements, the arrangement and connection of the elements, steps, the processing order of the steps etc. shown in the following exemplary embodiment are mere examples, and therefore do not limit the present invention. Therefore, among the elements in the following exemplary embodiment, those not recited in any one of the independent claims are described as optional elements.

Also note that the drawings are schematic diagrams, and thus they are not always exactly illustrated. Also, the same elements are assigned the same reference marks throughout the drawings. The following embodiment uses such expression as "approximately the same". The expression means, for example, not only "completely the same" but also "substantially the same". Stated differently, the expression also means, for example, that an error on the order of a few percent is included. Also, "approximately the same" means that something is the same within the scope in which the effect of the present disclosure is achievable. This is applicable to other expressions using "approximately".

[Embodiment]

Figure 2A:
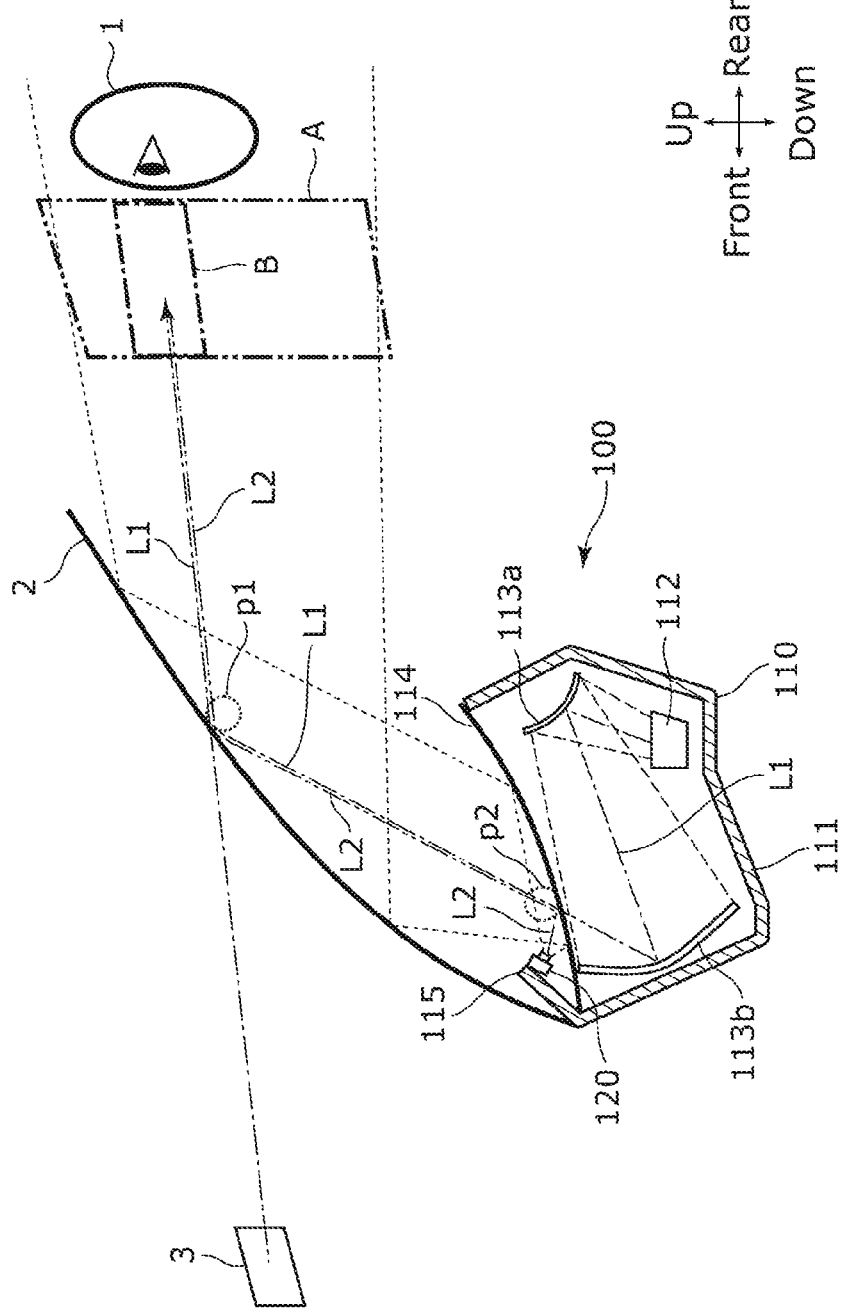
FIG. 2A is a diagram showing an example configuration of an imaging and display system in an embodiment.

FIG. 2A is a diagram showing an example configuration of an imaging and display system in the present embodiment.

Imaging and display system 100 in the present embodiment is, for example, a system mounted in a vehicle or the like having windshield 2. Imaging and display system 100 includes HUD 110 and driver monitoring camera 120.

HUD 110 forms virtual image 3. Such virtual image 3 is visible to driver 1, who is the user of imaging and display system 100, in a manner, for example, that such virtual image is present in a forward position outside of the vehicle. Such HUD 110 includes housing 111, display 112, first mirror 113a, second mirror 113b, light-transmissive cover 114, and supporting body 115.

Display 112 displays an image that is visible to driver 1 as virtual image 3. Stated differently, display 112 emits first light L1 that represents an image. Display 112 is, for example, a liquid crystal display (LCD). Note that display 112 may also be a device other than LCD, such as an organic light emitting diode, a fluorescent display device (known as seven-segment display), and a plasma display. Alternatively, display 112 may be a projector or a scanning laser. Housed at the bottom surface side inside of housing 111, such display 112 emits first light L1 toward the upper rear of vehicle 10.

First mirror 113a and second mirror 113b are included in an optical system for guiding first light L1 emitted from display 112 to outside of housing 111. For example, first light L1 emitted from display 112 is reflected by first mirror 113a toward a direction of second mirror 113b, and further reflected by second mirror 113b to outside of housing 111. Note that the optical system in the present embodiment includes two mirrors, that is, first mirror 113a and second mirror 113b, but is simply required to include at least one mirror.

Housing 111, an example of which is a resin molding, is disposed inside of the dashboard of the vehicle. Such housing 111 has an opening, and accommodates display 112, and first mirror 113a and second mirror 113b included in the foregoing optical system. Note that when disposed in the dashboard, housing 111 is placed with its opening facing up.

Light-transmissive cover 114 is a cover having transparency to light and is disposed to cover at least part of the opening of housing 111. Light-transmissive cover 114 is formed of, for example, a resin-molded film. Such light-transmissive cover 114 serves as a dust-resistant cover that prevents, for example, the entry of dust or dirt to inside of housing 111. Also, light-transmissive cover 114 is disposed in a manner that light-transmissive cover 114 is bending toward inside of housing 111. This enables at least part of light that enters light-transmissive cover 114 from a direction of windshield 2 to be reflected by light-transmissive cover 114 toward a direction of supporting body 115.

First light L1 emitted from display 112 in HUD 110 as described above passes through light-transmissive cover 114 via the optical system, and is reflected by windshield 2 toward a direction of driver 1. Note that windshield 2 is an example of the display medium having transparency to light and a plate shape. With this, driver 1 is able to see an image from display 112, which is first light 1 reflected, that appears as virtual image 3 in a forward position outside of windshield 2 (i.e., outside of the vehicle), while seeing the scenery through windshield 2.

Such HUD 110 is designed to enable virtual image 3 to be visible inside of a predetermined eye box B. Eye box B is set, for example, on the basis of the height and the horizontal position of the eyes of driver 1, and so forth. Virtual image 3 is thus visible to driver 1 with his/her eyes positioning inside of eye box B.

Supporting body 115 is a member that is connected outside of housing 111 to cover at least part of light-transmissive cover 114. More specifically, supporting body 115 is provided in a position that is more forward than the position of light-transmissive cover 114 in a manner that supporting body 115 stands from the upper front toward the upper rear of housing 111. Such supporting body 115 is referred to also as a bezel. Also, light reflected by light-transmissive cover 114 is radiated to supporting body 115 as described above. A light-receiving surface of supporting body 115 is configured to be hard to reflect such light. For example, such surface is in dark or black color. This reduces the scattering of light such as outside light. Such supporting body 115 is thus referred to also as light trap. Note that supporting body 115 may be provided integrally with or separately from housing 111 of HUD 110 described above.

Driver monitoring camera 120 in the present embodiment is a camera supported by supporting body 115 described above. More specifically, driver monitoring camera 120 is disposed on a surface of supporting body 115 which faces light-transmissive cover 114. Such driver monitoring camera 120 captures an image of driver 1 shown on light-transmissive cover 114.

Stated differently, second light L2 from a direction of driver 1 is reflected by windshield 2 toward a direction of light-transmissive cover 114. As a result, second light L2 reflected by windshield 2 is radiated to light-transmissive cover 114. Also, light-transmissive cover 114 is bending to enable light to be reflected toward a direction of supporting body 115 as described above. Second light L2 is thus reflected by light-transmissive cover 114 toward a direction of supporting body 115. With this, it is possible for driver monitoring camera 120 supported by supporting body 115 to capture an image of driver 1 shown on light-transmissive cover 114 by receiving second light L2 reflected by light-transmissive cover 114. This thus enables driver monitoring camera 120 to monitor drive 1.

In the present embodiment, driver monitoring camera 120 is disposed outside of housing 111 of HUD 110. This reduces the number of times second light L2 is reflected or passes through positions while traveling from a direction of driver 1 to driver monitoring camera 120. Stated differently, as shown in FIG. 2A, second light L2 reaches driver monitoring camera 120 after being reflected at position p1 on windshield 2 and then at position p2 on light-transmissive cover 114. This thus reduces the number of times second light L2 is reflected and passes through positions to two times. Consequently, it is possible to prevent a decrease in the luminance of a monitoring image (i.e., image captured) captured by driver monitoring camera 120.

Further, driver monitoring camera 120 is disposed close to light-transmissive cover 114 in the present embodiment, thereby widening imaging area A across which driver monitoring camera 120 is able to capture an image.

Figure 2B:
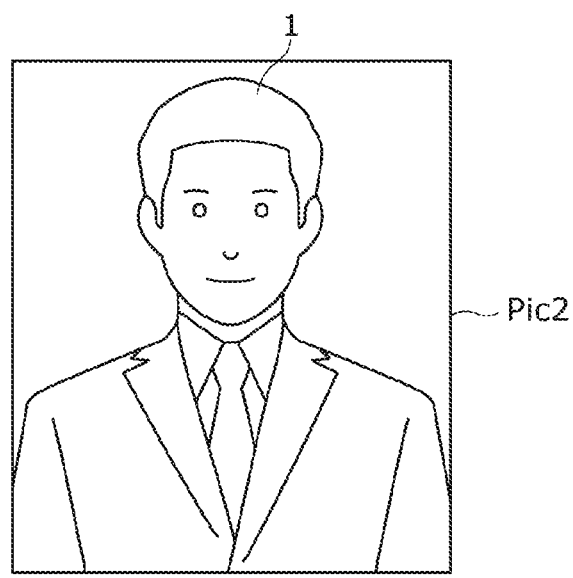
FIG. 2B is a diagram showing an example monitoring image captured by a driver monitoring camera in the embodiment.

FIG. 2B is a diagram showing an example monitoring image captured by driver monitoring camera 120.

Imaging area A is wide in the present embodiment as described above. As such, monitoring image Pic2 captured by driver monitoring camera 120 can show a wide area of driver 1. This enables appropriate monitoring of driver 1 on the basis of such monitoring image Pic2.

In the present embodiment, as described above, second light L2 from a direction of driver 1 reaches driver monitoring camera 120 without traveling via the optical system of HUD 110. This enables driver monitoring camera 120 to capture an image of driver 1, using second light L2 with high intensity. This increases the luminance of monitoring image Pic2 obtained by such imaging. Also, driver monitoring camera 120 is located outside of housing 111. This reduces the effect of collected heat on driver monitoring camera 120 even when sunlight causes collected heat inside of housing 111. Further, this increases the flexibility in the disposition and design of driver monitoring camera 120.

Further, driver monitoring camera 120 can be placed close to light-transmissive cover 114, thus achieving a wide imaging area A of monitoring camera 120. This enables an appropriate capturing of a bright image of a wide area of driver 1. To be more specific, it is possible to increase the imaging luminance that is the luminance of monitoring image Pic2 as described above. Stated differently, a sufficient imaging luminance is ensured. Further, second light L2 from a direction of driver 1 reaches driver monitoring camera 120 without traveling via the optical system of HUD 110, and thus the optical system of HUD 110 is not used for imaging. In other words, this simplifies the optical system used for imaging. Consequently, it is possible to increase the imaging resolution that is the resolution of monitoring image Pic2. Also, a wide imaging area A enables the capturing of an image of driver 1 even when such driver 1 is moving.

Also, driver monitoring camera 120 is disposed on a surface of supporting body 115, which covers at least part of light-transmissive cover 114, that is a surface facing light-transmissive cover 114. As such, it is possible for supporting body 115 to make driver monitoring camera 120 invisible to driver 1. This enables driver 1 to concentrate on an operation such as the driving of the vehicle, for example, without being aware of that s/he is subjected to imaging performed by driver monitoring camera 120.

Driver monitoring camera 120 in the foregoing example captures an image of driver 1 who is shown on light-transmissive cover 114 that is in a bending form. This can cause an astigmatic difference and image distortion. However, the occurrence of a distortion can be reduced by image processing or a correction optical system, and the occurrence of an astigmatic difference can be reduced by a correction optical system. For example, the correction optical system can reduce the occurrence of an astigmatic difference by optimally adjusting the focal depth of driver monitoring camera 120. The focal depth may be adjusted by controlling the aperture or by means of extended depth of focus (EODF) by inserting a phase object. This enables the obtainment of monitoring image Pict with reduced astigmatic difference and distortion.

[Variation 1]

Figure 3:
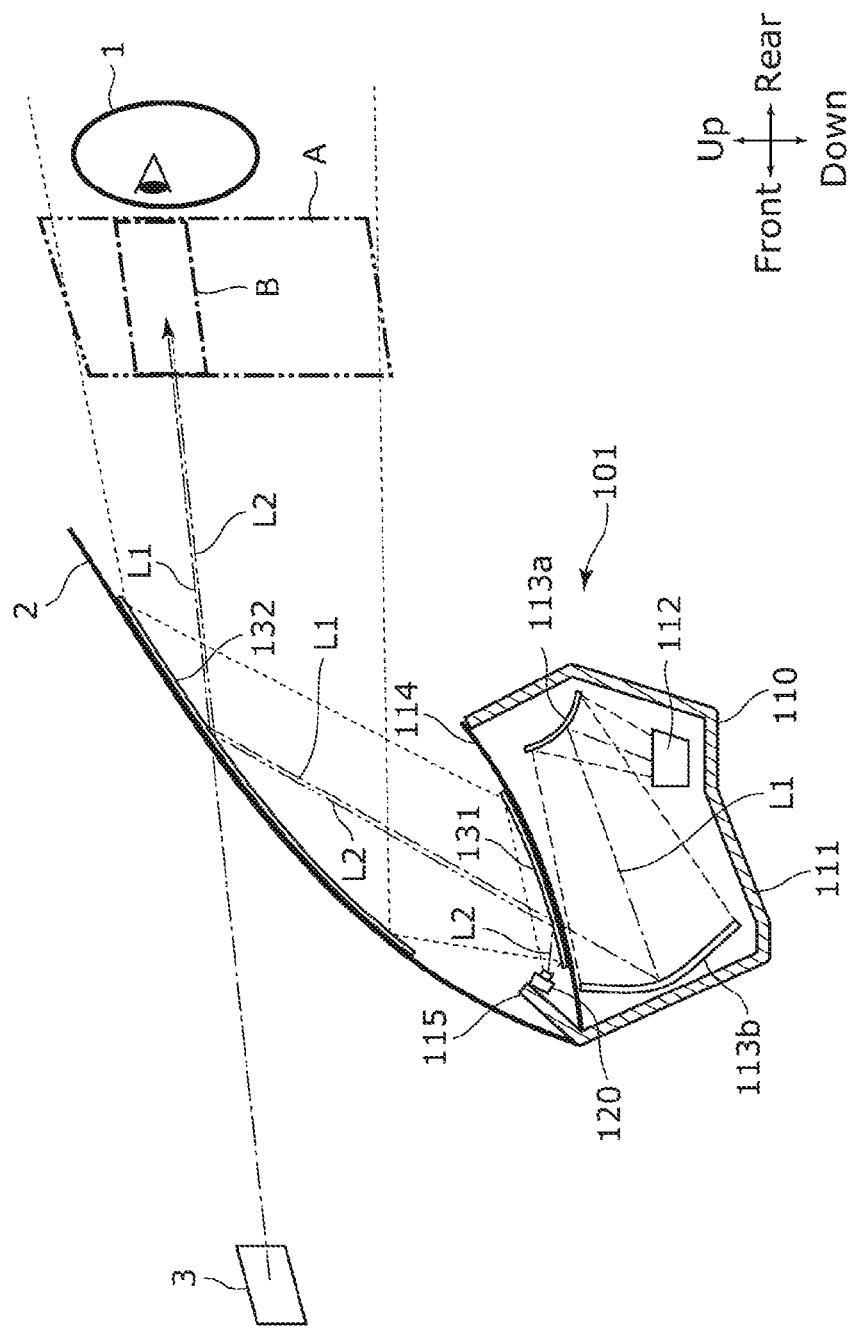
FIG. 3 is a diagram showing an example configuration of an imaging and display system in Variation 1 of the embodiment.

FIG. 3 is a diagram showing an example configuration of an imaging and display system in Variation 1 of the embodiment. As shown in FIG. 3, in imaging and display system 101 in the present variation, first infrared reflection layer 131 is stacked on light-transmissive cover 114. Such first infrared reflection layer 131 is formed of a material having a higher reflectivity for an infrared ray than for visible light and is transparent to visible light. First infrared reflection layer 131 is stacked, for example, on an upper surface of light-transmissive cover 114, that is, the surface facing windshield 2. Note that first infrared reflection layer 131 may be stacked on a lower surface of light-transmissive cover 114, that is, the surface opposite the surface facing windshield 2. Also note that first infrared reflection layer 131 may be configured as a film.

Further, second infrared reflection layer 132 is stacked on windshield 2 in the present variation. Such second infrared reflection layer 132 is formed of a material having a higher reflectivity for an infrared ray than for visible light and is transparent to visible light. Second infrared reflection layer 132 is stacked, for example, on an internal surface of windshield 2, that is, the surface facing driver 1. Note that second infrared reflection layer 132 may be stacked on an outer surface of windshield 2, that is, the surface opposite the surface facing driver 1. Also note that second infrared reflection layer 132 may be configured as a film.

Driver monitoring camera 120 in the present variation is an infrared camera. An infrared ray in the present disclosure is, for example, light in the near-infrared region, but may also be light in a region other than the near-infrared region.

With this, it is possible in the present variation that uses an infrared ray for imaging driver 1, to capture an image of driver 1 with reduced effect of, for example, outside light that is visible light, without decreasing the visibility of driver 1 to a virtual image.

Figure 4:
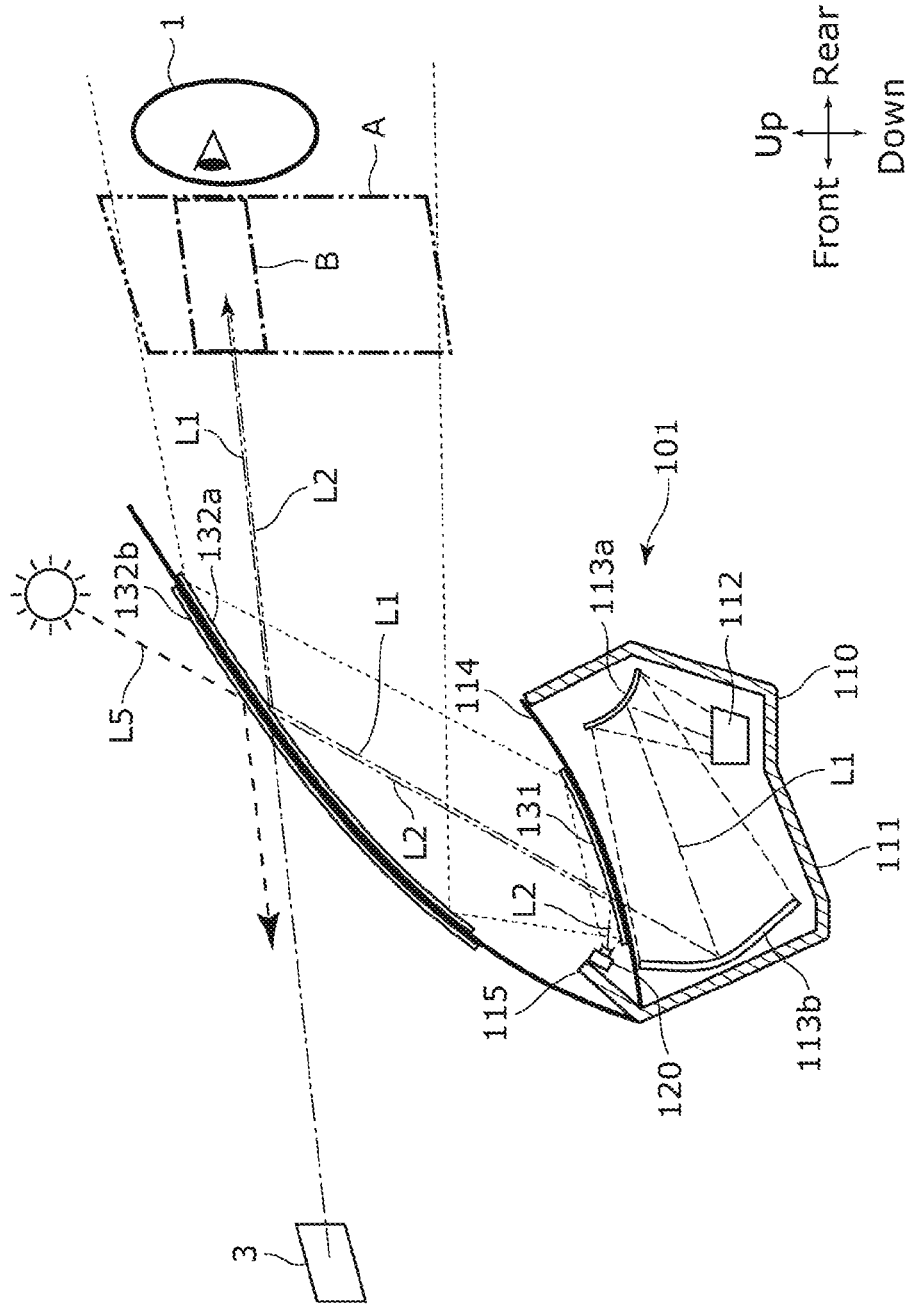
FIG. 4 is a diagram showing another example configuration of the imaging and display system in Variation 1 of the embodiment.

FIG. 4 is a diagram showing another example configuration of the imaging and display system in Variation 1 of the embodiment.

Here, as shown in FIG. 4, second infrared reflection layer 132 may include two reflection layers 132a and 132b. One of these two reflection layers 132a and 132b is provided on a surface of windshield 2 which faces driver 1 (i.e., internal surface). The other of two reflection layers 132a and 132b is provided on a surface of windshield 2 which is opposite the surface facing driver 1.

Second infrared reflection layer 132 that includes two reflection layers 132a and 132b results in an increase in the thickness of second infrared reflection layer 132. This achieves a more efficient reflection of an infrared ray that is included in sunlight L5 radiated on the outer surface of windshield 2, thereby further reducing the effect of an infrared ray included in sunlight 5 on imaging performed by driver monitoring camera 120.

[Variation 2]

Figure 5:
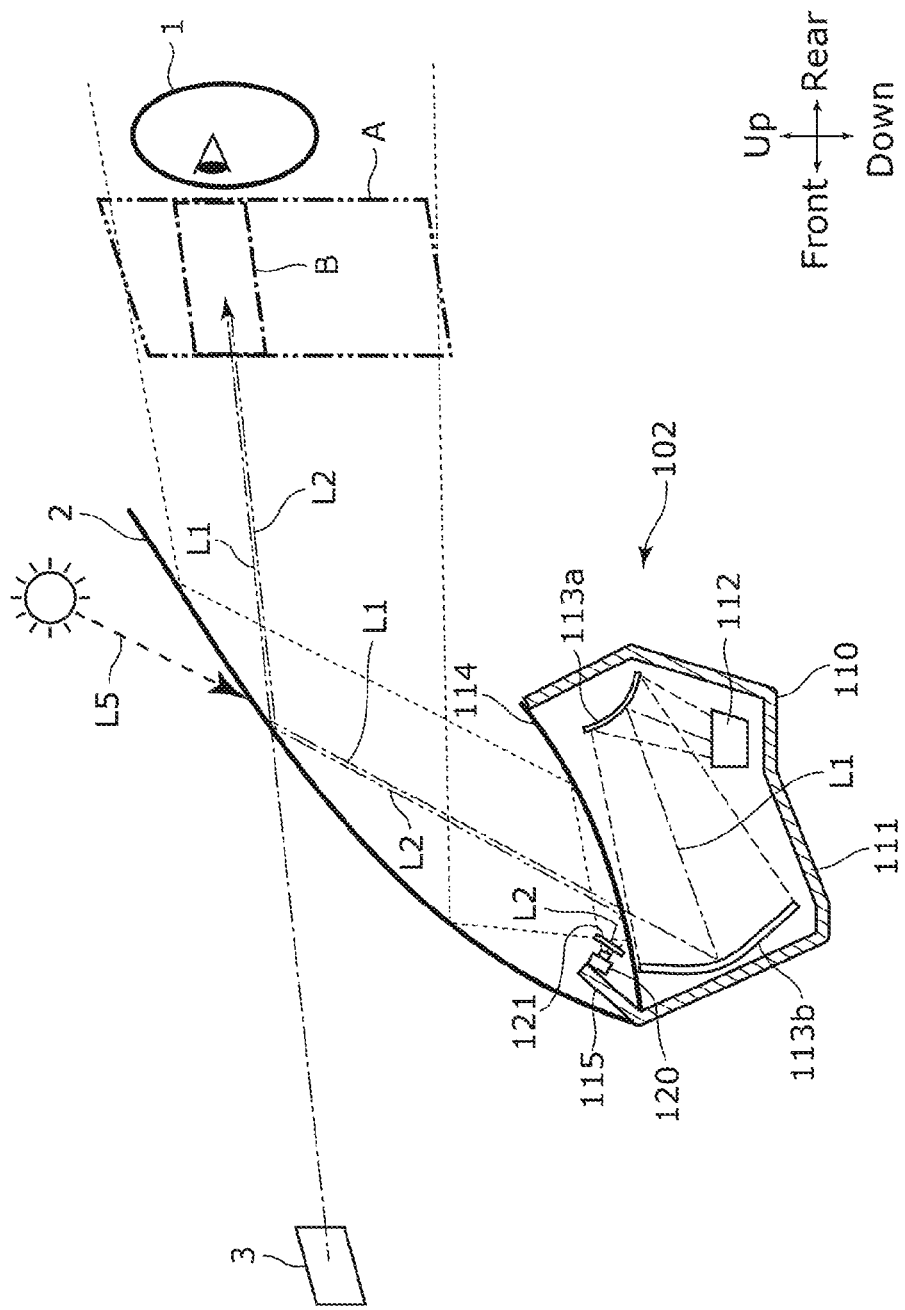
FIG. 5 is a diagram showing an example configuration of an imaging and display system in Variation 2 of the embodiment.

FIG. 5 is a diagram showing an example configuration of an imaging and display system in Variation 2 of the embodiment.

Imaging and display system 102 in the present variation includes the same elements as those of imaging and display system 100 in the foregoing embodiment, and further includes infrared-transmissive portion 121.

Infrared-transmissive portion 121 is transparent to an infrared ray and has the property that its reflectivity or absorption for light other than an infrared ray is higher than for an infrared ray. As shown in FIG. 5, for example, such infrared-transmissive portion 121 is disposed in front of driver monitoring camera 120, that is, between driver monitoring camera 120 and light-transmissive cover 114.

Driver monitoring camera 120 is an infrared camera as in the case of Variation 1. Driver monitoring camera 120 thus captures an image of driver 1, using an infrared ray that travels from a direction of light-transmissive cover 114 and enters the imaging element inside of driver monitoring camera 120 via infrared-transmissive portion 121.

This achieves more appropriate capturing of an image of driver 1 with reduced effect of, for example, outside light that is visible light. For example, it is possible to reduce the effect of sunlight 5.

Note that although located between driver monitoring camera 120 and light-transmissive cover 114, infrared-transmissive portion 121 in the present variation may be attached to driver monitoring camera 120 or housed inside of driver monitoring camera 120.

[Variation 3]

Figure 6:
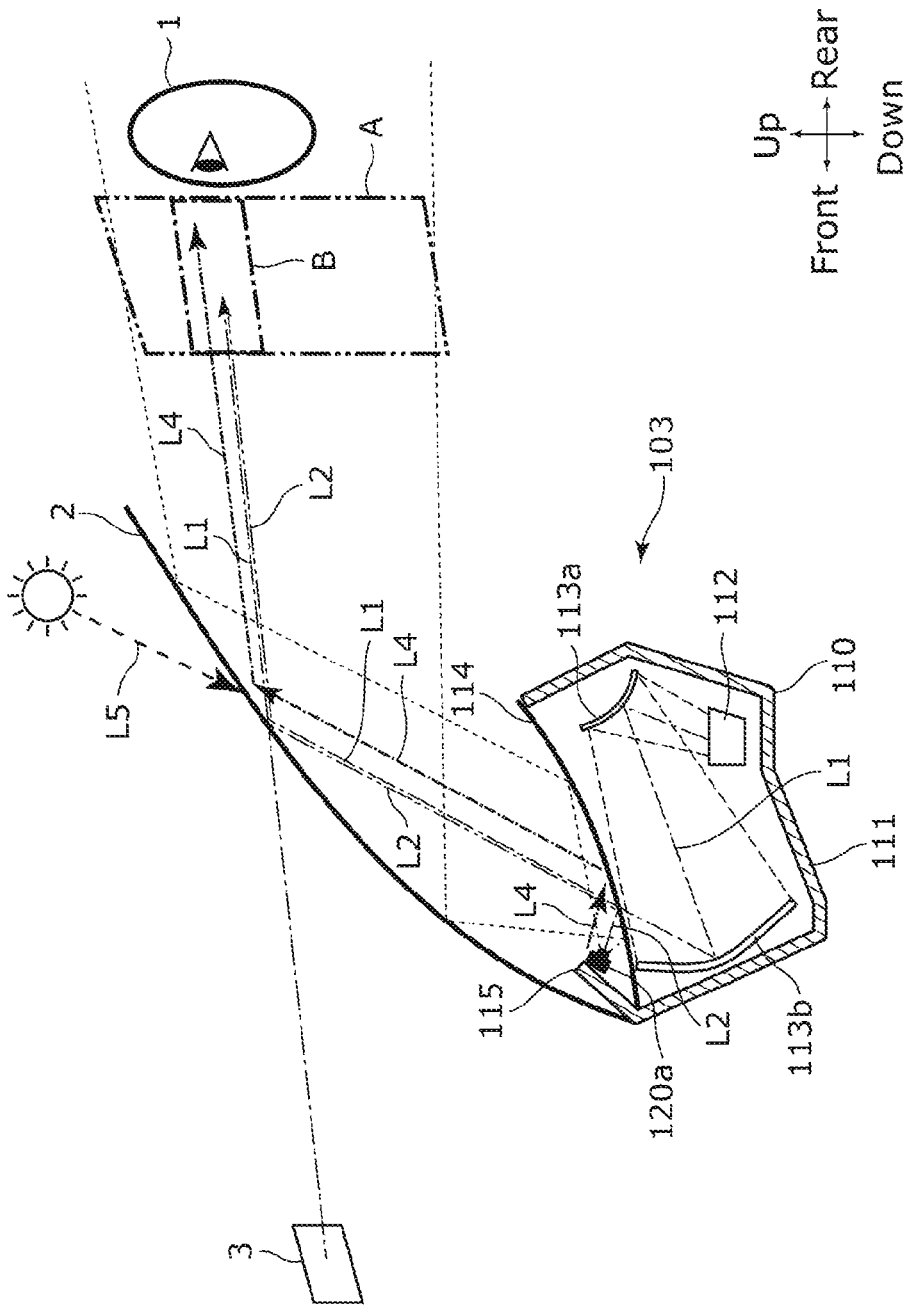
FIG. 6 is a diagram showing an example configuration of an imaging and display system in Variation 3 of the embodiment.

FIG. 6 is a diagram showing an example configuration of an imaging and display system in Variation 3 of the embodiment.

Imaging and display system 103 in the present variation includes driver monitoring camera 120a instead of driver monitoring camera 120 in imaging and display system 100 in the foregoing embodiment.

A low-reflection layer having a lower reflectivity for visible light than that of supporting body 115 is provided on a surface of such driver monitoring camera 120a.

With this, even when visible light included in, for example, sunlight is radiated to driver monitoring camera 120a, for example, it is possible to attenuate the intensity of outside light 4 that is the visible light reflected by driver monitoring camera 120a. This makes it hard for outside light L4 to reach driver 1. Stated differently, even when outside light L4 is reflected by light-transmissive cover 114 toward a direction of windshield 2, and further reflected by windshield 2 toward a direction of driver 1, it is possible to make it hard for driver 1 to see an image of driver monitoring camera 120a. In other words, it is possible to make it hard for driver 1 to notice the presence of driver monitoring camera 120a, thus increasing the viewability to an external environment.

Note that, in the present variation, the low-reflection layer is provided across the entire surface of driver monitoring camera 120a, but such low-reflection layer may be provided at least part of the surface.

[Variation 4]

Figure 7:
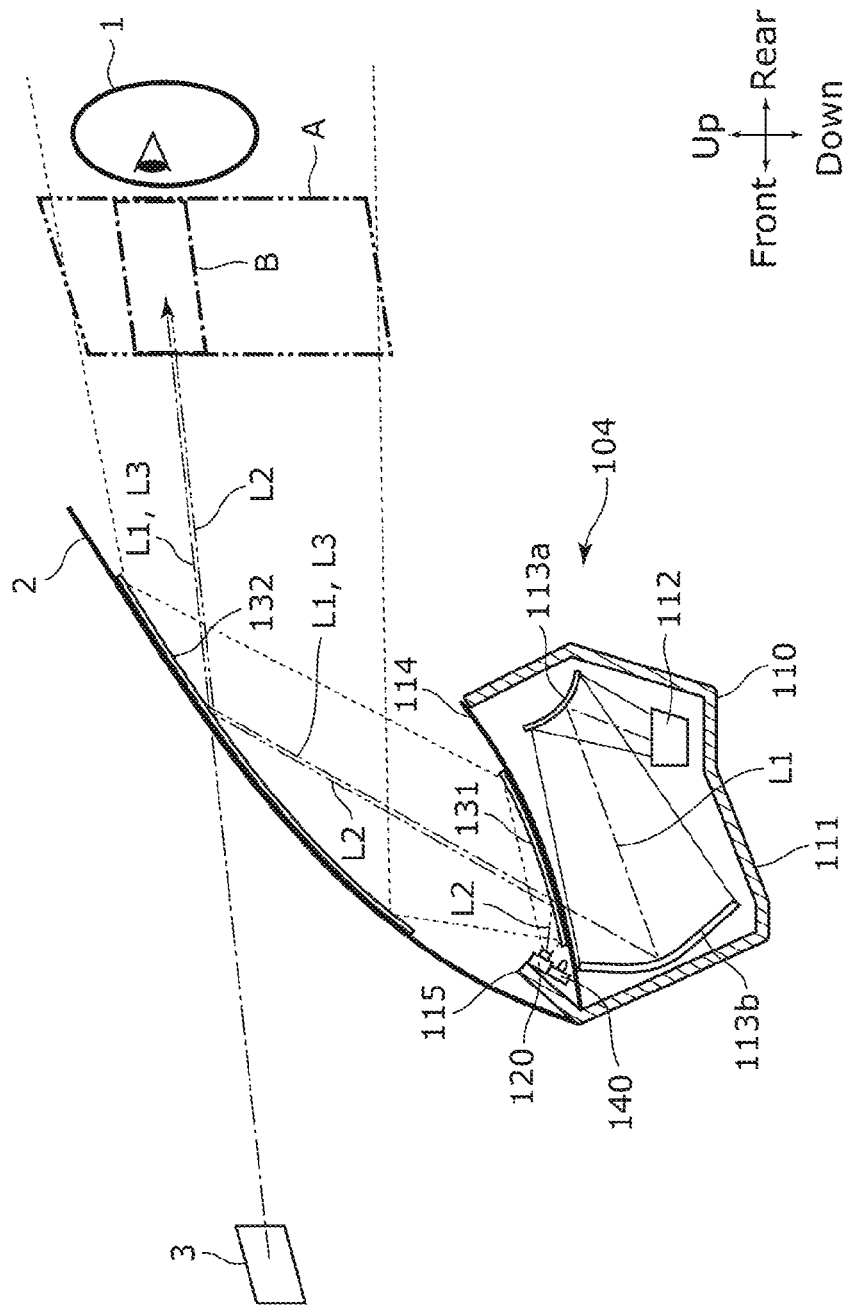
FIG. 7 is a diagram showing an example configuration of an imaging and display system in Variation 4 of the embodiment.

FIG. 7 is a diagram showing an example configuration of an imaging and display system in Variation 4 of the embodiment. Imaging and display system 104 in the present variation includes the same elements as those of imaging and display system 100 in the foregoing embodiment, and further includes light source 140.

Light source 140 is supported by supporting body 115, and emits an infrared ray as third light L3. Such third light L3 emitted from light source 140 is reflected by light-transmissive cover 114 toward a direction of windshield 2, and reflected by windshield 2 toward a direction of driver 1. Stated differently, third light L3 that is an infrared ray from light source 140 reaches driver 1 from light-transmissive cover 114 via an optical path that is approximately the same as that of first light L1 emitted from display 112. Driver monitoring camera 120 in the present variation is an infrared camera.

With this, driver 1 is lit up by such third light L3, thereby enabling driver monitoring camera 120 to capture and generate monitoring image Pict of such driver 1 having high luminance. Further, a radiation area of third light 3 is easy to be adjusted to imaging area A of driver monitoring camera 120. This enables light source 140 not to radiate third light L3 to a wider area than is necessary, thus reducing the radiation power of such third light L3.

[Variation 5]

Figure 8:
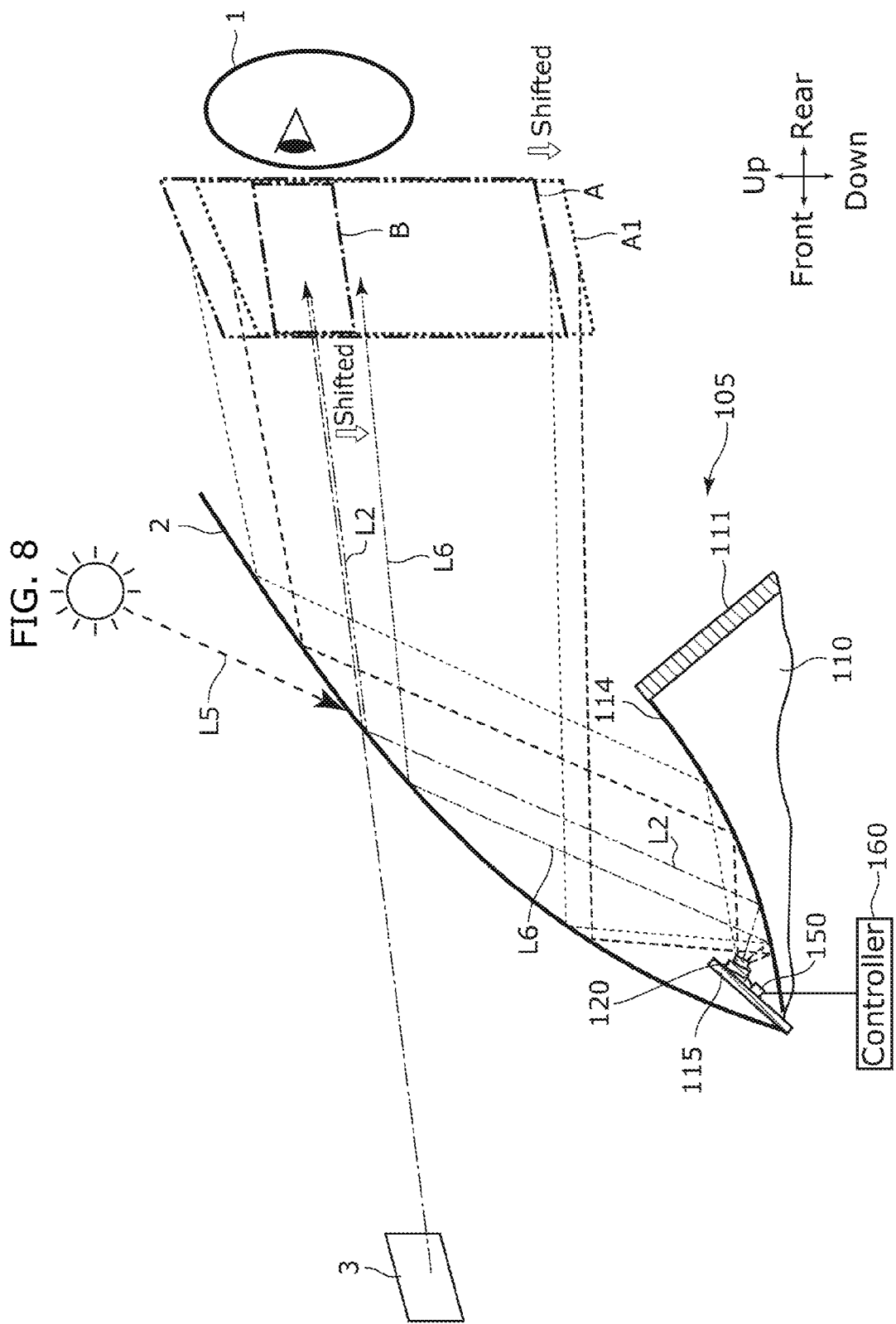
FIG. 8 is a diagram showing an example configuration of an imaging and display system in Variation 5 of the embodiment.

FIG. 8 is a diagram showing an example configuration of an imaging and display system in Variation 5 of the embodiment.

Imaging and display system 105 in the present variation includes the same elements as those of imaging and display system 100 in the foregoing embodiment, and further includes driving unit 150 and controller 160. Note that FIG. 8 partially shows part of imaging and display system 105.

Such imaging and display system 105 shifts the imaging area of driver monitoring camera 120 in accordance with outside light.

More specifically, driving unit 150 shifts the optical axis of driver monitoring camera 120 by, for example, tilting driver monitoring camera 120.

Controller 160 controls driving unit 150 on the basis of monitoring image Pic2 captured by driver monitoring camera 120.

Figure 9:
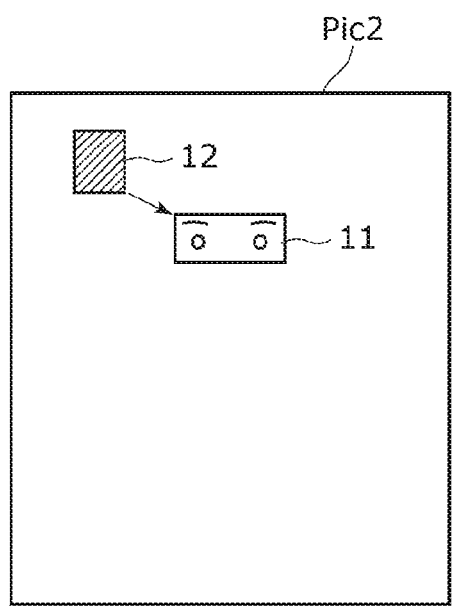
FIG. 9 is a diagram for describing processing performed by a controller in Variation 5 of the embodiment.

FIG. 9 is a diagram for exampling processing performed by controller 160.

Controller 160 causes driving unit 150 to shift the optical axis of driver monitoring camera 120 when second region 12 in monitoring image Pic2 is a predetermined distance or less from first region 11. First region 11 is a region in which part of driver 1 is shown. An example of first region 11 is a region in which the eyes of driver 1 are shown. For example, controller 160 identifies such first region by performing image processing such as pattern matching on monitoring image Pic2. Second region 12 is a region having higher luminance than that of first region 11. An example of second region 12 is a region brightly lit by sunlight L5. Also, for example, the average luminance of second region 12 may be higher than the average luminance of first region 11 and the maximum luminance of second region 12 may be higher than the maximum luminance of first region 11. Also, the distance between first region 11 and second region 12 may be the shortest distance between these regions, and may also be the distance between the centers of these regions.

Controller 160 thus causes driving unit 150 to shift the optical axis of driver monitoring camera 120 when bright second region 12 is located close to first region 11. Also, in the case where the foregoing predetermined distance is 0, controller 160 causes driving unit 150 to shift the optical axis of driver monitoring camera 120 when bright second region 12 overlaps first region 11.

With this, the optical axis of driver monitoring camera 120 is shifted, thereby shifting imaging area A to, for example, imaging area A1. Consequently, it is possible to increase the possibility of second region 12 being spaced apart from first region 11.

This results in an increased possibility of preventing part of driver 1 shown in first region 11 from becoming unsharp due to second region 12 overlapping first region 11. When the foregoing part of driver 1 is the eyes, for example, it is hard to identify the state of driver 1, such as whether driver 1 is sleepy, looking away, and so forth, from monitoring image Pic2 that includes such unsharp first region 11. However, imaging and display system 105 in the present variation is capable of preventing first region 11 from becoming unsharp due to second region 12 overlapping first region 11, thus achieving appropriate monitoring of the state of driver 1.

In the foregoing example, the optical axis of driver monitoring camera 120 is shifted to change imaging area A to imaging area A1, but two driver monitoring cameras having mutually different optical axes may be switched therebetween.

Figure 10:
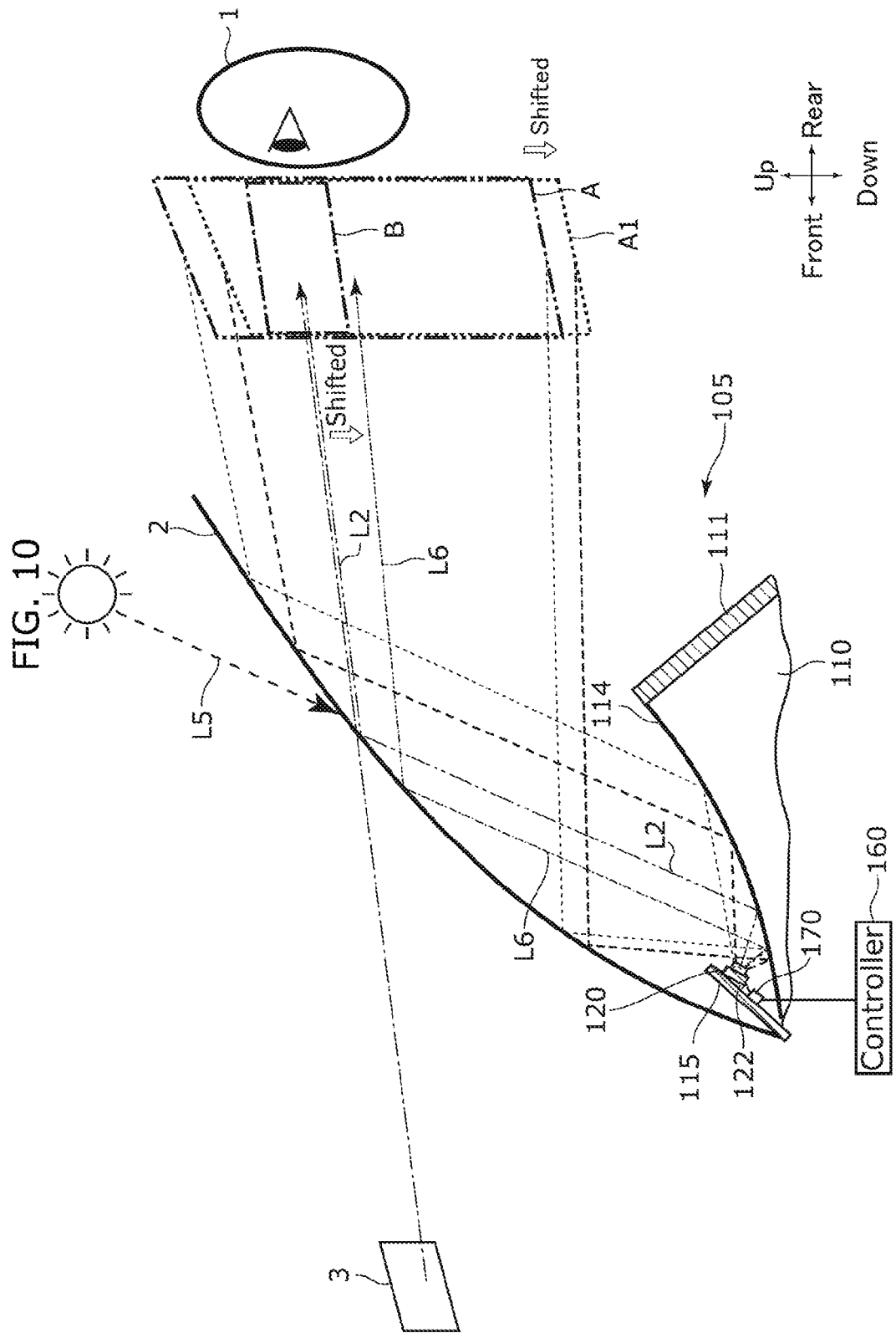
FIG. 10 is a diagram showing another example configuration of the imaging and display system in Variation 5 of the embodiment.

FIG. 10 is a diagram showing another example configuration of imaging and display system 105 in Variation 5 of the embodiment.

Imaging and display system 105 shown in FIG. 10 includes two driver monitoring cameras 120 and 122. Stated differently, imaging and display system 105 includes driver monitoring camera 122 having a different optical axis from that of driver monitoring camera 120.

Also, imaging and display system 105 shown in FIG. 10 includes switcher 170 instead of driving unit 150 shown in FIG. 8. Switcher 170 switches the camera used for imaging driver 1 between driver monitoring camera 120 and driver monitoring camera 122. In an example shown in FIG. 10, controller 160 controls switcher 170 on the basis of monitoring image Pic2 captured by driver monitoring camera 120.

Stated differently, as shown in FIG. 9, controller 160 causes switcher 170 to switch the camera from driver monitoring camera 120 to driver monitoring camera 122 when second region 12 in monitoring image Pic2 is a predetermined distance or less from first region 11.

Thus, controller 160 controls switcher 170, when bright second region 12 is located close to first region 11, to switch the camera used for imaging driver 1 from driver monitoring camera 120 to driver monitoring camera 122. Also, in the case where the foregoing predetermined distance is 0, controller 160 controls switcher 170 to switch the camera used for imaging driver 1 when bright second region 12 overlaps first region 11.

Such switching of the cameras enables imaging area A to be changed, for example, to imaging area A1. This results in an increased possibility of second region 12 being spaced apart far from first region 11 in a monitoring image captured by driver monitoring camera 122, compared to monitoring image Pic2 captured by driver monitoring camera 120.

Figure 11:
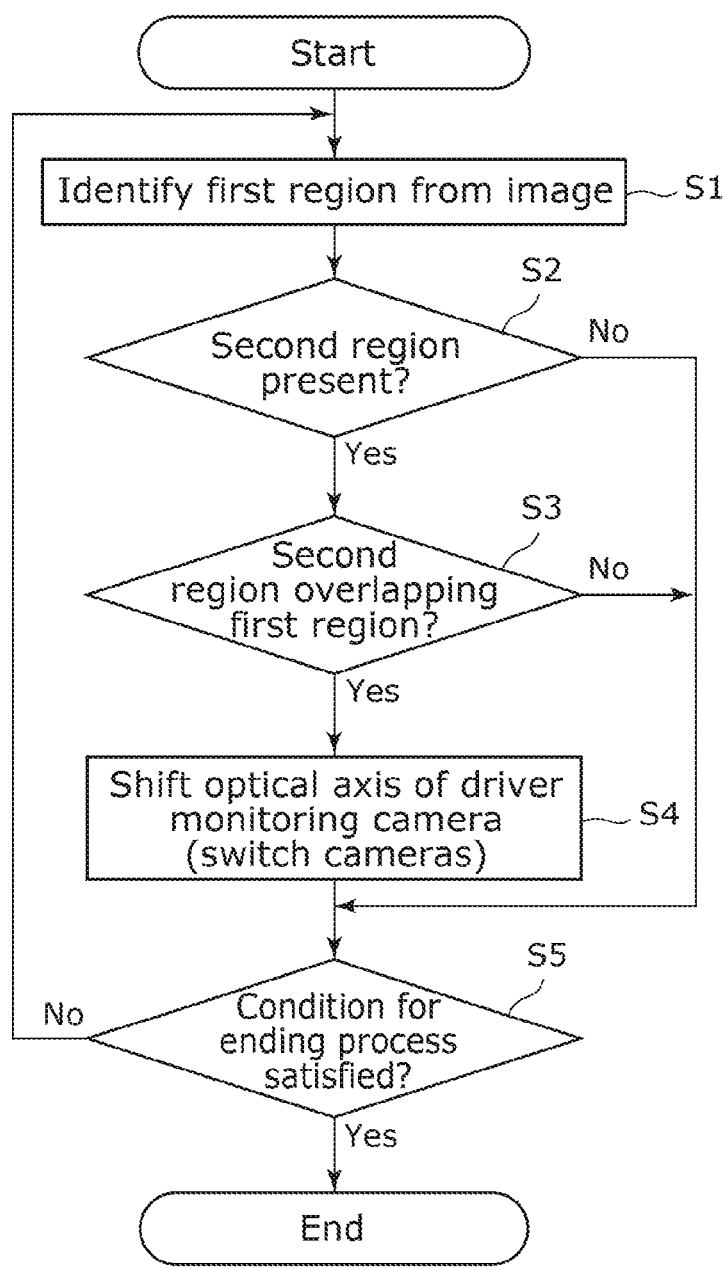
FIG. 11 is a flowchart of processing operations performed by the controller in Variation 5 of the embodiment.

FIG. 11 is a flowchart of processing operations performed by controller 160.

First, controller 160 identifies first region 11 from monitoring image Pic2 (step S1).

Next, controller 160 determines whether second region 12 having higher luminance than that of first region 11 is present in such monitoring image Pic2 (step S2).

Here, when determining that second region 12 is present (Yes in step S2), controller 160 further determines whether second region 12 is located at a distance of 0 or less from first region 11, that is, whether second region 12 overlaps first region 11 (step S3). Here, in an example shown in FIG.

8, when determining that second region 12 overlaps first region 11 (Yes in step S3), controller 160 causes driving unit 150 to shift the optical axis of driver monitoring camera 120 (step S4). In an example shown in FIG. 10, controller 160 controls switcher 170 to switch the camera used for imaging driver 1 from driver monitoring camera 120 to driver monitoring camera 122.

Subsequently, controller 160 determines whether a condition for ending the processes of monitoring driver 1 is satisfied (step S5). Controller 160 determines that such condition is satisfied when, for example, the ignition switch of the vehicle is turned off. Here, when determining that such condition is satisfied (Yes in step S5), controller 160 ends the processes for monitoring. Meanwhile, when determining that such condition is not satisfied, (No in step S5), controller 160 repeatedly performs the processes from step S1. When step S1 is repeated, first region 11 is identified not from monitoring image Pic2 in which first region 11 is identified in step S1 performed earlier, but from monitoring image Pic2 newly obtained by driver monitoring camera 120.

Note that when repeatedly shifted by driving unit 150, the optical axis may be shifted alternately up and down or in only one of the upward and downward directions. Also, when the cameras are switched in step S4, after which the processes are repeated from step S1, steps S1 through S3 are performed on a monitoring image captured by the newly switched camera. In step S4, for example, after the camera used for imaging driver 1 is switched from driver monitoring camera 120 to driver monitoring camera 122, driver monitoring camera 122 is to be used instead of driver monitoring camera 120. Stated differently, in step S1, controller 160 identifies first region 11 from a monitoring image captured by driver monitoring camera 122. In step S4 to be performed later, controller 160 controls switcher 170 to switch the camera used for imaging driver 1 from driver monitoring camera 122 to driver monitoring camera 120.

Also, in an example of FIG. 10, imaging and display system 105 includes two monitoring cameras 120 and 122, but may include three or more driver monitoring cameras, and these cameras are switched therebetween. For example, controller 160 may select the monitoring image in which second region 12 is most spaced apart from first region 11, among monitoring images captured by such three or more driver monitoring cameras.

[Other Variations]

The embodiment and variations thereof have been described above to illustrate the imaging and display system according to one or more aspects, but the present disclosure is not limited to such embodiment and variations thereof. The scope of the present disclosure may thus include: an embodiment achieved by making various modifications to the embodiment and variations thereof that can be conceived by those skilled in the art without departing from the essence of the present disclosure; and an embodiment achieved by combining some of the elements in the embodiment and variations thereof.

In the foregoing embodiment and variations thereof, for example, the imaging and display system includes driver monitoring camera 120 and causes it to capture an image for the purpose of monitoring driver 1. However, the purpose is not limited to the monitoring of driver 1, and thus driver monitoring camera 120 may be caused to capture an image for other purposes. In this case, driver monitoring camera 120 is used simply as camera 120 and captures an image of the user of the imaging and display system.

Also, in the foregoing embodiment and variations thereof, the imaging and display system is mounted in a vehicle, but may not be mounted in such vehicle. Also, windshield 2 may be anything that is capable of serving as a display medium.

Also, first infrared reflection layer 131, second infrared reflection layer 132, and infrared-transmissive portion 121 may each be formed of a known material.

The present disclosure has described the imaging and display system having a HUD, using the embodiment and variations thereof, but such imaging and display system may include no HUD. In this case, the imaging and display system can be referred to also as an imaging system. Such imaging system includes a reflection sheet and driver monitoring camera 120 supported by supporting body 115 that is disposed to cover at least part of such reflection sheet. Note that the reflection sheet may be light-transmissive cover 114, but may not have transparency to visible light as in the case of light-transmissive cover 114 so long as the reflection sheet is capable of reflecting light from a direction of windshield 2 serving as a display medium. Driver monitoring camera 120 is disposed on a surface of supporting body 115 which faces the reflection sheet. Such driver monitoring camera 120 captures an image of the user who is driver 1, for example, shown on the reflection sheet, using light from a direction of the user that has been reflected by windshield 2 toward a direction of the reflection sheet. Such imaging system is also capable of appropriately capturing an image of the user as with the imaging and display system described above.

Note that each of the elements such as driving unit 150, controller 160, and switcher 170 in Variation 5 described above may be configured in the form of an exclusive hardware product, or may be realized by executing a software program suitable for the element. Each of the elements may be realized by means of a program executer, such as a CPU and a processor, reading and executing the software program recorded on a recording medium such as a hard disk or a semiconductor memory. Here, the software product that realizes controller 160 in Variation 5 is a program for causing the steps in the flowchart in FIG. 11 to be executed.

Further Information about Technical Background to this Application

The disclosures of the following patent applications including specification, drawings, and claims are incorporated herein by reference in their entirety: PCT International Application No. PCT/JP2021/001360 filed on Jan. 15, 2021, designating the United States of America, which is based on and claims priority of Japanese Patent Application No. 2020-063144 filed on Mar. 31, 2020.

INDUSTRIAL APPLICABILITY

The imaging and display system of the present disclosure is applicable for use, for example, as an in-vehicle device that is mounted in a vehicle and captures an image of the driver of the vehicle while making a virtual image visible to the driver.

The invention claimed is:

1. An imaging and display system comprising:
a display that emits first light representing an image;
an optical system that includes at least one mirror;
a housing that has an opening and accommodates the display and the optical system;
a light-transmissive cover that has transparency to light and is disposed to cover at least part of the opening of the housing;

a support having a low-reflection outer surface and being connected outside of the housing to cover at least part of the light-transmissive cover; and a camera supported by the support, wherein a low-reflection coating is provided on at least part of the camera, the low-reflection coating having a lower visible light reflectivity than a visible light reflectivity of the low-reflective outer surface of the support, wherein the first light emitted from the display passes through the light-transmissive cover via the optical system, and is reflected by a display medium toward a direction of a user, and the camera is disposed on a surface of the support, and captures an image of the user shown on the light-transmissive cover by second light from the direction of the user reflected by the display medium toward a direction of the light-transmissive cover, the surface of the support being a surface facing the light-transmissive cover.

2. The imaging and display system according to claim 1, wherein a first infrared reflection layer is stacked on the light-transmissive cover, the first infrared reflection layer having a higher reflectivity for an infrared ray than for visible light and transparent to visible light, and the camera is an infrared camera.

3. The imaging and display system according to claim 2, wherein a second infrared reflection layer is stacked on the display medium, the second infrared reflection layer having a higher reflectivity for an infrared ray than for visible light and transparent to visible light.

4. The imaging and display system according to claim 3, wherein the second infrared reflection layer includes two reflection layers, one of the two reflection layers is provided on a surface of the display medium, the surface being a surface facing the user, and a remaining one of the two reflection layers is provided on a surface of the display medium, the surface being a surface opposite the surface facing the user.

5. The imaging and display system according to claim 1, further comprising:

an infrared-transmissive portion that is transparent to an infrared ray and has a higher reflectivity or absorptivity for light other than an infrared ray than for an infrared ray, wherein the camera is an infrared camera and captures an image of the user, using an infrared ray that enters an imaging element inside the camera from the direction of the light-transmissive cover via the infrared-transmissive portion.

6. The imaging and display system according to claim 1, further comprising:

a light source that is supported by the support and emits an infrared ray as third light, wherein the camera is an infrared camera, and the third light emitted from the light source is reflected by the light-transmissive cover toward a direction of the display medium and reflected by the display medium toward the direction of the user.

7. The imaging and display system according to claim 1, further comprising:

a driving unit that shifts an optical axis of the camera; and a controller that controls the driving unit, based on an image captured by the camera, wherein the controller causes the driving unit to shift the optical axis of the camera when a second region in the image captured is a predetermined distance or less from a first region in which part of the user is shown, the second region having higher luminance than luminance of the first region.

8. The imaging and display system according to claim 1, further comprising:

a second camera different from a first camera that is the camera;

a switcher that switches a camera used for imaging the user between the first camera and the second camera; and a controller that controls the switcher, based on an image captured by the first camera, wherein the controller causes the switcher to switch the camera from the first camera to the second camera when a second region in the image captured is a predetermined distance or less from a first region in which part of the user is shown, the second region having higher luminance than luminance of the first region.

* * * * *